United States Patent
Shepherd et al.

(10) Patent No.: US 10,316,713 B2
(45) Date of Patent: Jun. 11, 2019

(54) RECIRCULATION VALVE

(71) Applicant: Concentric Birmingham Limited, Birmingham (GB)

(72) Inventors: Paul Shepherd, Birmingham (GB); Mark Pieczko, Birmingham (GB)

(73) Assignee: CONCENTRIC BIRMINGHAM LIMITED, Birmingham (GB)

( * ) Notice: Subject to any disclaimer, the term of this patent is extended or adjusted under 35 U.S.C. 154(b) by 238 days.

(21) Appl. No.: 15/046,736

(22) Filed: Feb. 18, 2016

(65) Prior Publication Data

US 2016/0265679 A1 Sep. 15, 2016

(30) Foreign Application Priority Data

Mar. 10, 2015 (GB) .................................. 1504058.7

(51) Int. Cl.
*F01M 1/16* (2006.01)
*F01M 11/02* (2006.01)
*G05D 16/20* (2006.01)
*F16K 31/124* (2006.01)

(52) U.S. Cl.
CPC .............. *F01M 11/02* (2013.01); *F01M 1/16* (2013.01); *G05D 16/2086* (2013.01); *F16K 31/124* (2013.01); *G05D 16/2093* (2013.01)

(58) Field of Classification Search
CPC ...... F01M 11/02; F01M 1/16; G05D 16/2086; G05D 16/2093; G05D 16/2097; F16K 31/124
See application file for complete search history.

(56) References Cited

U.S. PATENT DOCUMENTS

| 2,411,930 | A | * | 12/1946 | Mathys | G05D 16/103 137/470 |
| 5,267,587 | A | * | 12/1993 | Brown | E03B 7/071 137/486 |
| 6,540,204 | B1 | * | 4/2003 | Carter | F16K 31/406 137/489.5 |
| 7,775,503 | B2 | * | 8/2010 | Zhou | F01M 1/20 137/523 |
| 8,186,327 | B2 | * | 5/2012 | Ni | F01M 1/16 123/196 CP |
| 8,202,061 | B2 | * | 6/2012 | Shulver | F01M 1/16 417/212 |

(Continued)

FOREIGN PATENT DOCUMENTS

EP 0980995 2/2000
JP 2011047298 3/2011

OTHER PUBLICATIONS

GB Search Report for Application No. GB 1504058.7, dated Aug. 21, 2015, 5 Pages.

*Primary Examiner* — William M McCalister
(74) *Attorney, Agent, or Firm* — Brooks Kushman P.C.

(57) ABSTRACT

A recirculation valve for a pump having a regulator spool, a first resilient biasing member and a control valve. The first resilient biasing member biases the regulator spool in a first position in which flow of a liquid from a first port of the pump to a second port of the pump is prevented. The control valve controls the force required to move the regulator spool against the first resilient biasing member to a second position in which flow of the liquid from the first port to the second port is enabled.

4 Claims, 8 Drawing Sheets

(56) References Cited

U.S. PATENT DOCUMENTS

| | | | | |
|---|---|---|---|---|
| 8,763,634 B2* | 7/2014 | Akaishi | ............... | F01M 1/16 137/512.5 |
| 9,624,797 B2* | 4/2017 | Bonde | ............... | F01M 1/16 |
| 2006/0104823 A1* | 5/2006 | Hunter | ............... | F01M 1/16 417/44.2 |
| 2006/0218911 A1* | 10/2006 | Bickley | ............... | F02C 7/232 60/426 |
| 2010/0028171 A1* | 2/2010 | Shulver | ............... | F01M 1/16 417/307 |
| 2010/0192898 A1* | 8/2010 | Ni | ............... | F01M 1/16 123/196 R |
| 2010/0243079 A1* | 9/2010 | Boehm | ............... | G05D 16/2013 137/488 |
| 2012/0118257 A1* | 5/2012 | Chung | ............... | F01M 1/02 123/196 R |
| 2012/0180878 A1* | 7/2012 | Greenwood | ............... | A01B 63/1006 137/488 |
| 2012/0240893 A1* | 9/2012 | Hoji | ............... | F01M 1/16 123/196 R |
| 2012/0291536 A1* | 11/2012 | Okazawa | ............... | F01M 1/16 73/114.57 |
| 2013/0343937 A1* | 12/2013 | Williamson | ............... | F01M 1/16 417/447 |
| 2014/0060679 A1* | 3/2014 | Wi | ............... | F01M 1/16 137/565.3 |
| 2015/0096630 A1* | 4/2015 | Ogawa | ............... | F16K 31/406 137/487.5 |
| 2015/0107686 A1* | 4/2015 | Watanabe | ............... | F01M 1/16 137/102 |
| 2015/0144207 A1* | 5/2015 | Inagaki | ............... | F16H 61/00 137/487.5 |

* cited by examiner

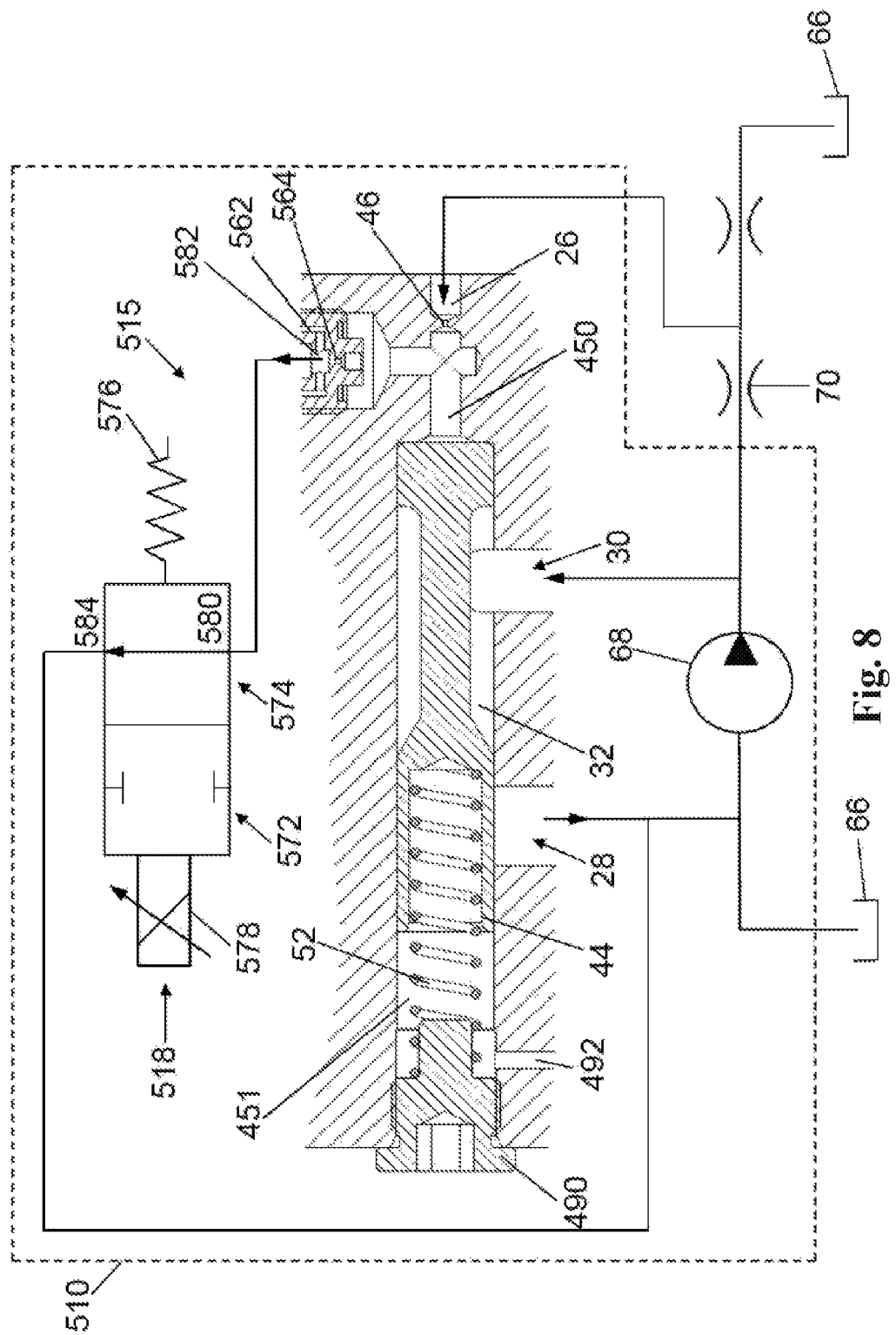

RECIRCULATION VALVE

CROSS-REFERENCE TO RELATED APPLICATIONS

This application claims priority to GB patent application No. 1504058.7 filed on Mar. 10, 2015, the disclosure of which is hereby incorporated in its entirety by reference herein.

TECHNICAL FIELD

The present invention relates to a recirculation valve. More specifically, the present invention relates to an electric recirculation valve, for example an electric recirculation valve for a pump for controlling or regulating oil recirculation in internal combustion engines.

BACKGROUND

Lubricating oil is circulated through engines in order to reduce friction between moving parts and to remove heat from pistons, bearings and shafts.

Oil pumps are known to include a recirculation valve for controlling or regulating the delivery of oil to an engine. Such recirculation valves are designed to open when the pressure of oil in an engine reaches a predetermined value and prevent excess oil flow being delivered to the engine main gallery.

One example of a known recirculation valve is a directional control valve having a control chamber, a spring and a spool. When the pressure of oil in the engine exceeds the pressure in the control chamber by more than the compression pressure of the spring, the spool moves beyond the break edge of the pump, allowing oil to flow from the outlet of the pump to the inlet. In this way excess oil is recirculated and not delivered to the engine main gallery or other oil consumers within the lubrication system.

Since such recirculation valves only open at a single, predetermined regulation pressure, which is controlled by the compression pressure of the spring, it is only possible to regulate the engine oil pressure at a single, predetermined feedback pressure. This can result in a delivery of oil flow that is greater than the optimum amount at a given operating condition. For example, during operating conditions where the piston cooling jets are inoperable a much lower pump output can be tolerated. Reducing the pump output to the ideal optimum reduces the work that the pump must do and in turn reduces the parasitic drag on the engine, leading to increased engine efficiency.

SUMMARY

According to a first aspect of the present invention there is provided an electric recirculation valve for a pump, the electric recirculation valve comprising a regulator spool, a first resilient biasing means and a control valve, wherein the first resilient biasing means biases the regulator spool in a first position in which flow of a liquid from a first port of the pump to a second port of the pump is prevented; and the control valve controls the force required to move the regulator spool against the first resilient biasing means to a second position in which flow of the liquid from the first port to the second port is enabled.

The control valve advantageously enables the force required to move the regulator spool from the first position, in which recirculation flow is not possible, to the second position, in which recirculation flow is enabled, to be varied.

The control valve may comprise a second resilient biasing means and a vent. The control valve may be an electromagnetic solenoid valve, for example an electromagnetic solenoid valve having an on/off solenoid or a proportional solenoid.

The use of an on/off solenoid enables the force required to move the regulator spool to be set at a maximum and a minimum force. The use of a proportional solenoid enables the force required to move the regulator spool to be varied over a range between a maximum force and a minimum force.

According to a second aspect of the present invention, there is provided a pump comprising a first port, a second port and a recirculation valve comprising a regulator spool and a first resilient biasing means, wherein the first resilient biasing means biases the regulator spool in a first position in which flow of a liquid from the first port to the second port is prevented; and the pump further comprises a control valve to control the force required to move the regulator spool against the first resilient biasing means to a second position, in which flow of the liquid from the first port to the second port is enabled.

The control valve may be housed within the pump. The control valve may further include a second resilient biasing means and a vent. The control valve may be an electromagnetic solenoid valve, for example an electromagnetic solenoid valve comprising an on/off solenoid or a proportional solenoid.

According to a third aspect of the present invention, there is provided a method of controlling the recirculation of a liquid between a first port and a second port, the method comprising the steps of: (a) providing a recirculation valve comprising a regulator spool and a first resilient biasing means, wherein the first resilient biasing means biases the regulator spool in a first position in which flow of a liquid from the first port to the second port is prevented; (b) providing a control valve having a second resilient biasing means and a vent; and (c) using the control valve to vary the force required to move the regulator spool against the first resilient biasing means to a second position in which flow of the liquid from the first port to the second port is enabled.

The method may further comprise increasing the force acting on the regulator spool against the first resilient biasing means to enable movement of the regulator spool to the second position.

Alternatively, the method may further comprise reducing the force acting on the first resilient biasing means to enable movement of the regulator spool to the second position.

The control valve may be an electromagnetic solenoid valve, for example an electromagnetic solenoid valve comprising an on/off solenoid or a proportional solenoid.

BRIEF DESCRIPTION OF THE DRAWINGS

An example of a recirculation valve in accordance with the present invention will now be described with reference to the accompanying figures in which:

FIG. 8 is a hydraulic circuit diagram of the pump assembly of FIG. 7 with the electromagnetic solenoid valve vented to the inlet port.

DETAILED DESCRIPTION

Figure 1:
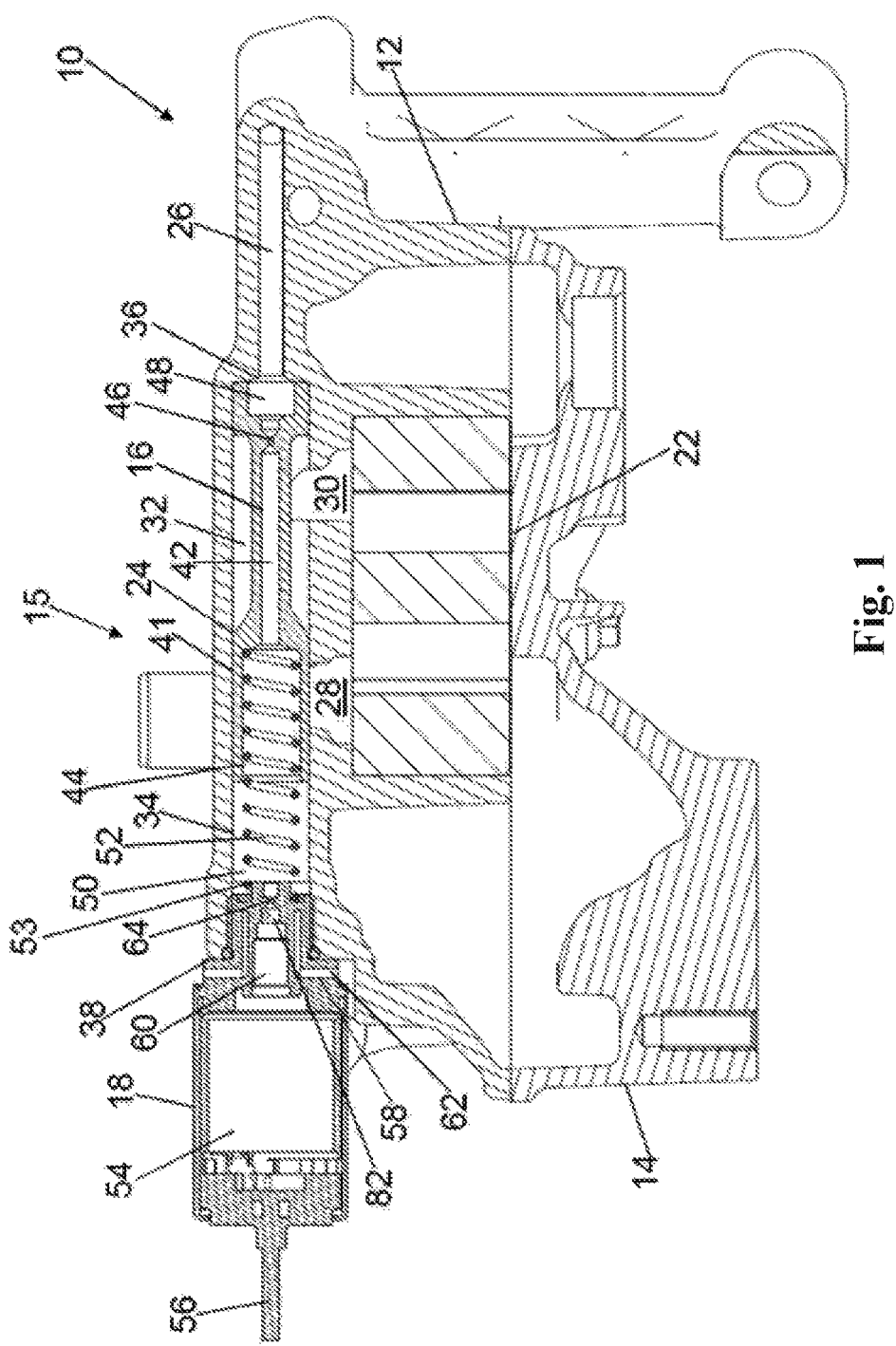
FIG. 1 is a part-sectioned side view of a pump assembly having a recirculation valve according to a first embodiment of the present invention.

Referring now to FIG. 1 there is shown a pump assembly 10 comprising a pump housing 12, a pump cover 14 and a recirculation valve 15 according to a first embodiment of the invention. The recirculation valve 15 comprises a regulator spool valve 16, an electromagnetic solenoid valve 18 and a regulator spring 52.

The housing 12 comprises gear pocket 22, a valve cavity 24 and a gallery cavity 26 defined therein. The housing 12 defines an inlet port 28 which is in communication with an external source of fluid (66 in FIG. 2) and an outlet port 30 which is in fluid communication with a fluid cavity 32 for pressurized fluid to be delivered.

The valve cavity 24 is generally cylindrical and has a wall 34 extending along its length. A first end 36 of the valve cavity 24 is open to the gallery cavity 26 and the other end 38 of the valve cavity 24 is open to the exterior of the housing 12.

The gallery cavity 26 is generally cylindrical and extends between the first end 36 of the valve cavity 24 and the engine main gallery (not shown) from which pressurized fluid is delivered.

The generally cylindrical regulator spool valve 16 has a wall 41 and a cylindrical bore 42 that extends between a spring guide 44 at one end and an orifice 46 at the other end. The orifice 46 opens in to a fluid passage 48, which is in communication with the gallery cavity 26. The spring guide 44 is positioned adjacent to a control chamber 50 in which the regulator spring 52 is located. The regulator spring 52 is mounted at an opposite end 53 of the control chamber 50 to the spring guide 44. The free end of the regulator spring 52 is positioned within the spring guide 44.

The electromagnetic solenoid valve 18 comprises a first cylindrical body 54 having an electrical connector 56 at a first end and a shoulder portion 58 which leads to a second cylindrical body 60 at an end opposite to the first end. The second cylindrical body 60 is aligned with the first cylindrical body 54, but has a smaller diameter. The shoulder portion 58 has a vent port 62. The electromagnetic solenoid valve 18 has a spring (76 in FIG. 2), a pressure face (not shown), a proportional solenoid (78 in FIG. 2), and an internal venting mechanism (not shown) having a spool (not shown), a fluid passage 82 and an orifice 64. The fluid passage 82 is in fluid communication with the orifice 64, which is in fluid communication with the control chamber 50 of the regulator spool valve 16.

The pump assembly 10 is assembled as follows.

The regulator spool valve 16 is mounted in the valve cavity 24 such that the wall 41 of the regulator spool valve 16 is in sliding engagement with the wall 34 of the valve cavity 24. The fluid passage 48 of the regulator spool valve 16 is connected to the gallery cavity 26. As shown in FIG. 1, the outlet port 30 is in fluid communication with the fluid cavity 32.

The second body 60 of the electromagnetic solenoid valve 18 is mounted in the open end 38 of the valve cavity 24. As described above, the orifice 64 is in fluid communication with the control chamber 50 of the regulator spool valve 16.

Figure 2:
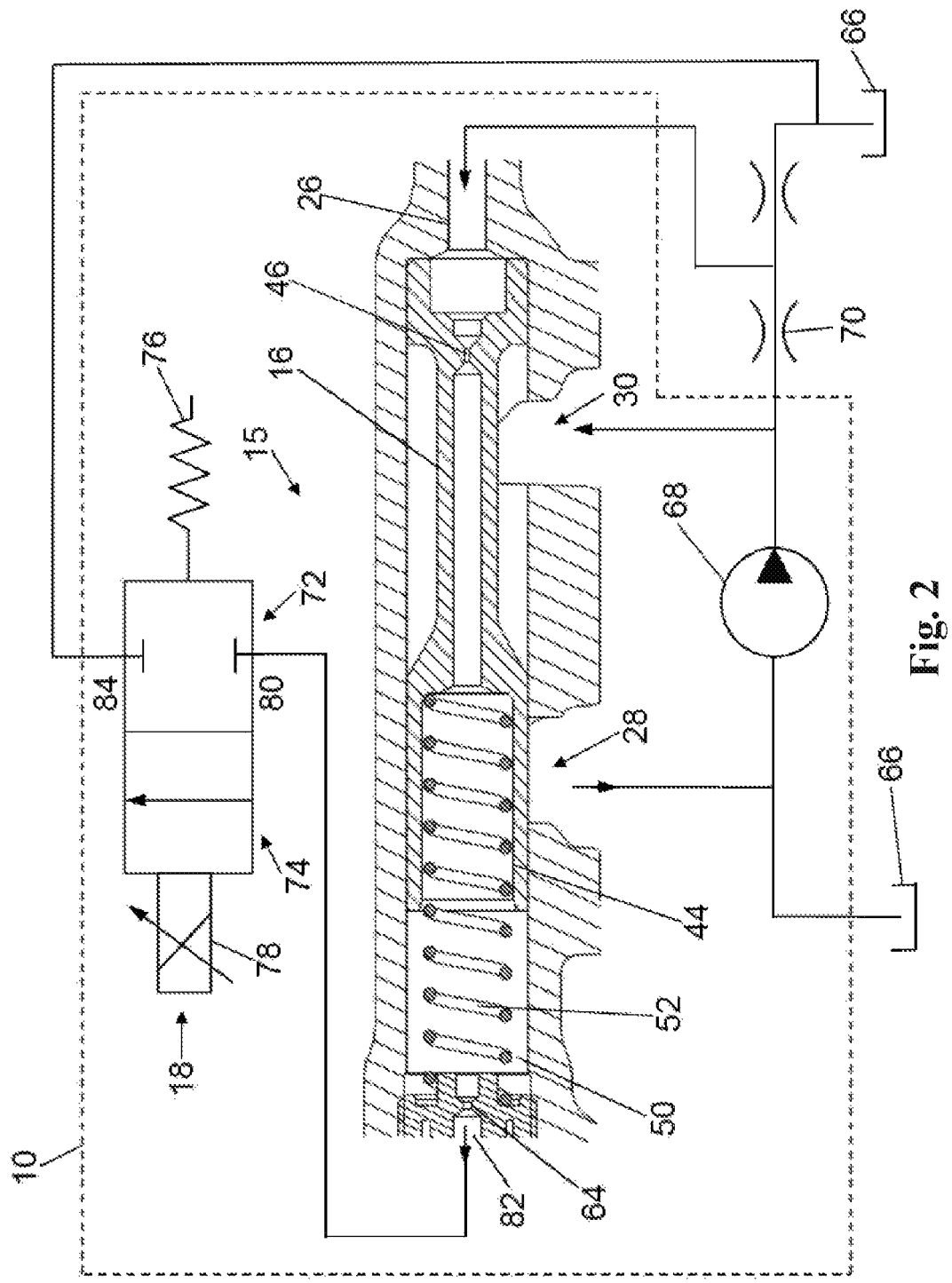
FIG. 2 is a hydraulic circuit diagram of the pump assembly of FIG. 1 with the electromagnetic valve and the regulator spool valve shown in the closed position.

Turning now to FIG. 2, there is shown the pump assembly 10 of FIG. 1 with an external source of fluid 66, a pump 68, an engine cooler and filter orifice 70 and the electromagnetic solenoid valve 18 shown in diagrammatic form. The electromagnetic solenoid valve 18 is a normally-closed two-way valve. The electromagnetic solenoid valve 18 has two positions: a closed position 72 and an open position 74.

Fluid pressure acting on the pressure face (not shown) of the electromagnetic solenoid valve spool (not shown) opposes force from the electromagnetic solenoid valve spring 76 to move the electromagnetic solenoid valve 18 from normally closed position 72 to open position 74. Applying voltage to the proportional electromagnetic solenoid 78 changes the pre-load on the electromagnetic solenoid valve spring 76 in order to change the pressure required to move the electromagnetic solenoid valve 18 between the two positions 72, 74.

The electromagnetic solenoid valve 18 has:
a first port 80 in communication with a first side of the electromagnetic solenoid valve 18 and fluid passage 82; and
second port 84 in communication with a second side of the electromagnetic solenoid valve 18 and the external source of fluid 66.

Operation of the recirculation valve when no voltage is applied to the electromagnetic solenoid valve 18 will now be described.

With the electromagnetic solenoid valve 18 in normally closed position 72, the pressure of fluid in the control chamber 50 equals the pressure of fluid in the gallery cavity 26 (the feedback pressure).

When the pressure of fluid in the fluid passage 82 is below lower vent limit of the electromagnetic solenoid valve spring 76, the force exerted on the electromagnetic solenoid valve spool (not shown) is not sufficient to move it far enough to cause the vent port 62 to be opened, and so the electromagnetic solenoid valve 18 remains in first position 72.

The forces acting on the regulator spool valve 16, due to the pressure of fluid in cavities 26 and 50, are equal and opposite and the force from the regulator spring 52 prevents movement of the regulator spool valve 16. Under these conditions, the regulator spool valve 16 remains in the position shown in FIGS. 1 and 2 with the outlet port 30 in fluid communication with the fluid cavity 32 and the inlet port 28 isolated from the fluid cavity 32. As such, there is no recirculation flow from the outlet port 30 to the inlet port 28.

When the feedback pressure is increased, the control chamber pressure and the pressure of fluid in the fluid passage 82 is increased. When the pressure of fluid in fluid passage 82 exceeds the lower vent limit of the electromagnetic solenoid valve spring 76, the electromagnetic solenoid valve spool (not shown) compresses the electromagnetic solenoid valve spring 76 and moves beyond the break edge of the vent port 62. As the vent port 62 starts to open, a flow of fluid is created through the orifice 46, which creates a pressure differential between cavities 26 and 50. This imbalance of fluid pressures creates a net force on the regulator spool valve 16 that opposes the force from regulator spring 52 and causes the regulator spool valve 16 to begin to move. The net force acting on the regulator spool valve 16 is not sufficient to enable it to move beyond the break edge of the inlet port 28 in the pump housing 12. Under these conditions, there is no recirculation flow from the outlet port 30 to the inlet port 28 and the inlet port 28 remains isolated from the fluid cavity 32.

Figure 3:
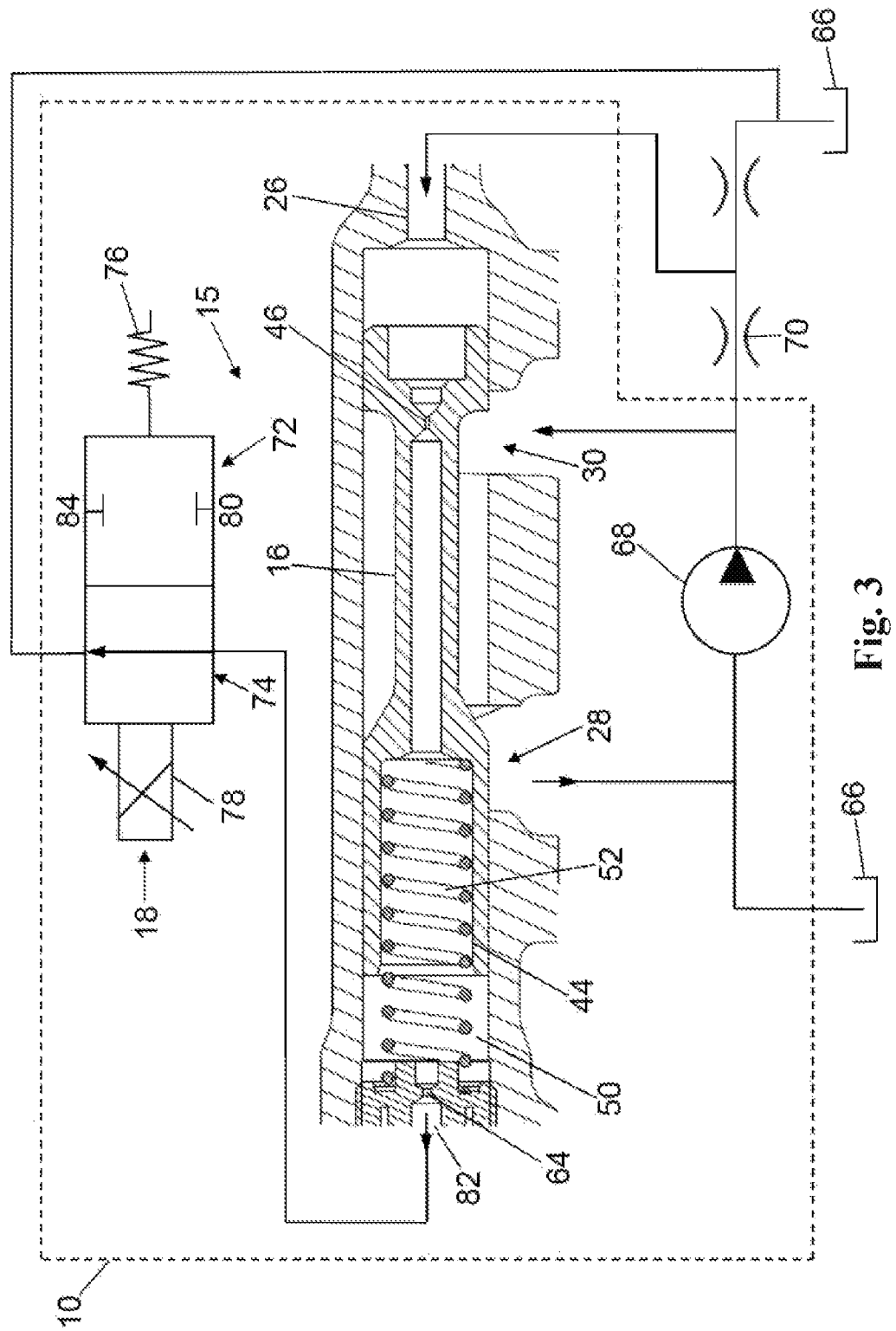
FIG. 3 is a hydraulic circuit diagram of the pump assembly of FIG. 1 with the electromagnetic valve shown in the open position and the regulator spool valve shown in the recirculating position.

When the feedback pressure is further increased, the pressure of fluid in the control chamber 50 and the fluid passage 82 is further increased, causing vent port 62 to open fully. When the vent port 62 is fully opened the flow of fluid through the orifice 46 increases, causing an increase in the pressure differential between cavities 26 and 50. This increased imbalance of fluid pressures leads to an increase in the net force on the regulator spool valve 16 that opposes the force from the regulator spring 52. Under these conditions, the regulator spool valve 16 compresses the regulator spring 52 further and the regulator spool valve 16 moves beyond its break edge, causing the inlet port 28 to be in fluid communication with the fluid cavity 32 and enabling recirculation flow from the outlet port 30 to the inlet port 28, as shown in FIG. 3.

When no voltage is applied to the electromagnetic solenoid valve 18, it performs as a mechanical vent to control movement of the regulator spool valve 16 against the regulator spring 52.

In this way, when the pressure of oil in an engine (not shown) exceeds the pressure in the control chamber 50, with the regulator spring 52 compressed and the regulator spool valve 16 moved beyond its break edge, oil is pumped from the outlet 30 to the inlet 28 and the engine circuit is bypassed. As described above, because the regulator spool valve 16 only opens at a single, predetermined regulation pressure, which is controlled by the spring rate of the regulator spring 52 and the rate of venting from the control chamber 50 by vent port 62, it is only possible to regulate the engine oil pressure at a single, predetermined feedback pressure.

Operation of the recirculation valve according to the invention, when voltage is applied to the electromagnetic solenoid valve 18, will now be described.

Direct Current (DC) voltage is supplied to the electromagnetic solenoid valve 18 by pulse width modulation so that the supply voltage is switched on and off at a given frequency for a modulated period of time (duty cycle). The duty cycle is the time the voltage is "on" and is expressed as a percentage of the time period, for example at 50% duty cycle, the voltage is "on" for 50% of the time period and "off" for 50% of the time period. In this way the time averaged voltage is only 50% of the maximum supply voltage and the current to the solenoid is only 50% of the maximum. In this way, the pulse width modulation signal controls the solenoid.

At 100% duty cycle, the maximum voltage is supplied to the electromagnetic solenoid valve 18 causing the pre-load of the electromagnetic solenoid valve spring 76 to be reduced to a minimum. In this way, the pressure of fluid in the passage 82 necessary to cause the electromagnetic solenoid valve spool (not shown) to move to its break edge and open the vent port 62 is reduced to a minimum required pressure. Similarly, the pressure differential required to cause the regulator spool valve 16 to open the re-circulation path from 30 to 28 will occur at the minimum gallery feedback pressure.

At zero duty cycle no voltage is supplied to the electromagnetic solenoid valve 18, and so the electromagnetic solenoid valve 18 performs as a mechanical vent as described above.

By varying the duty cycle of the electromagnetic solenoid valve 18 between 0% and 100%, the pre-load of the spring 76 can be varied between a minimum and a maximum force, enabling the feedback pressures at which recirculation occurs to be varied within a range depending on the requirements of the engine, thereby reducing the drive power of the pump 68. As the pump 68 is engine driven, this reduces the parasitic loss and improves the engine efficiency.

Figure 4:
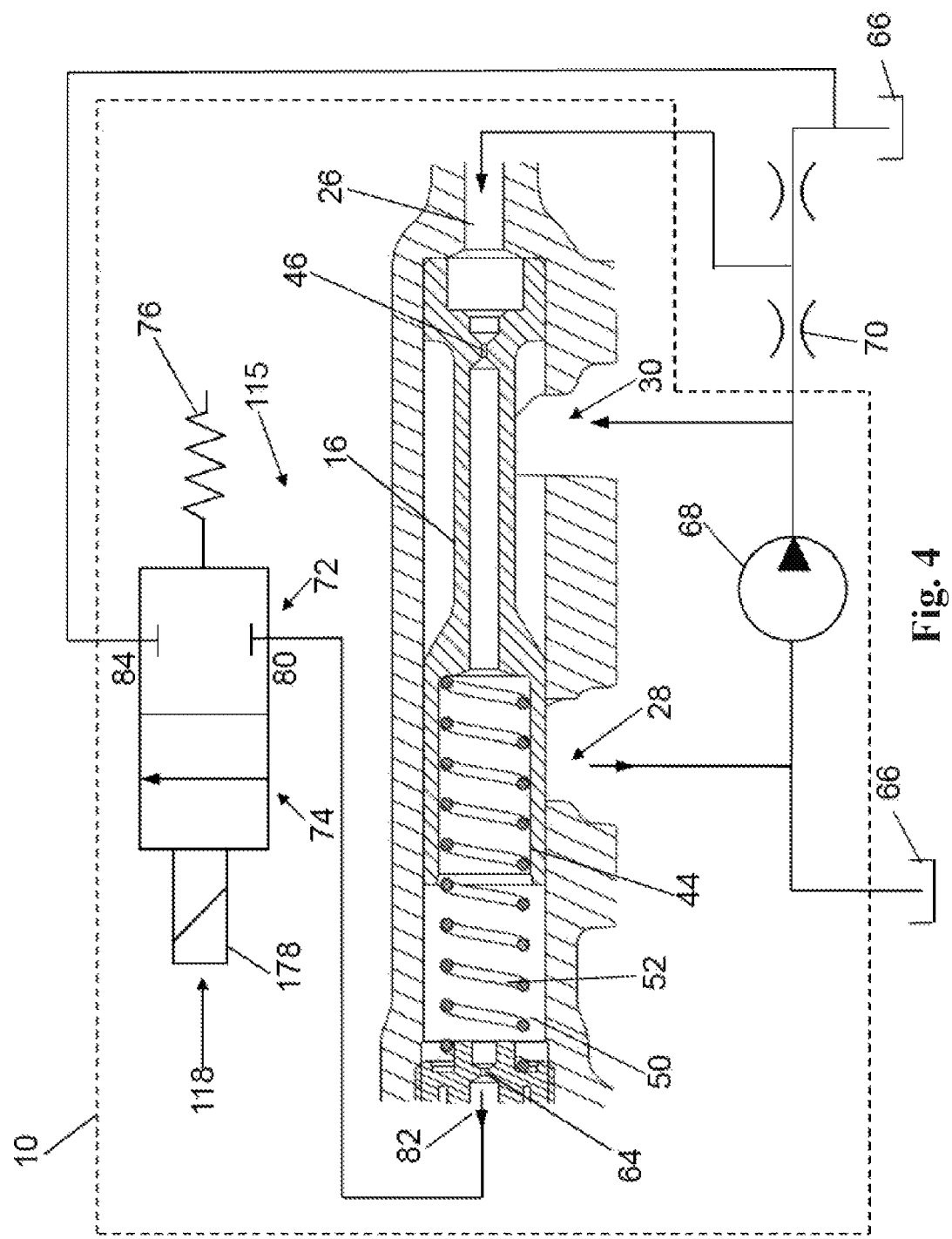
FIG. 4 is a hydraulic circuit diagram of a pump assembly having a recirculation valve according to a second embodiment of the present invention.

Referring now to FIG. 4, there is shown the pump assembly 10 of FIG. 1 with a recirculation valve 115 according to a second embodiment of the present invention. Like reference numerals depict like features, which will not be described further.

The electromagnetic solenoid valve 118 of this embodiment differs from that of the first embodiment as the electromagnetic solenoid valve 118 has an on/off solenoid 178. The electromagnetic solenoid valve 118 of this embodiment only operates at 100% duty cycle or zero duty cycle and so the pre-load of the electromagnetic solenoid valve spring 76 is either a minimum or maximum force (and cannot be varied between these values). Accordingly the recirculation valve 115 can be set such that recirculation occurs only at one of two feedback pressures.

Figure 5:
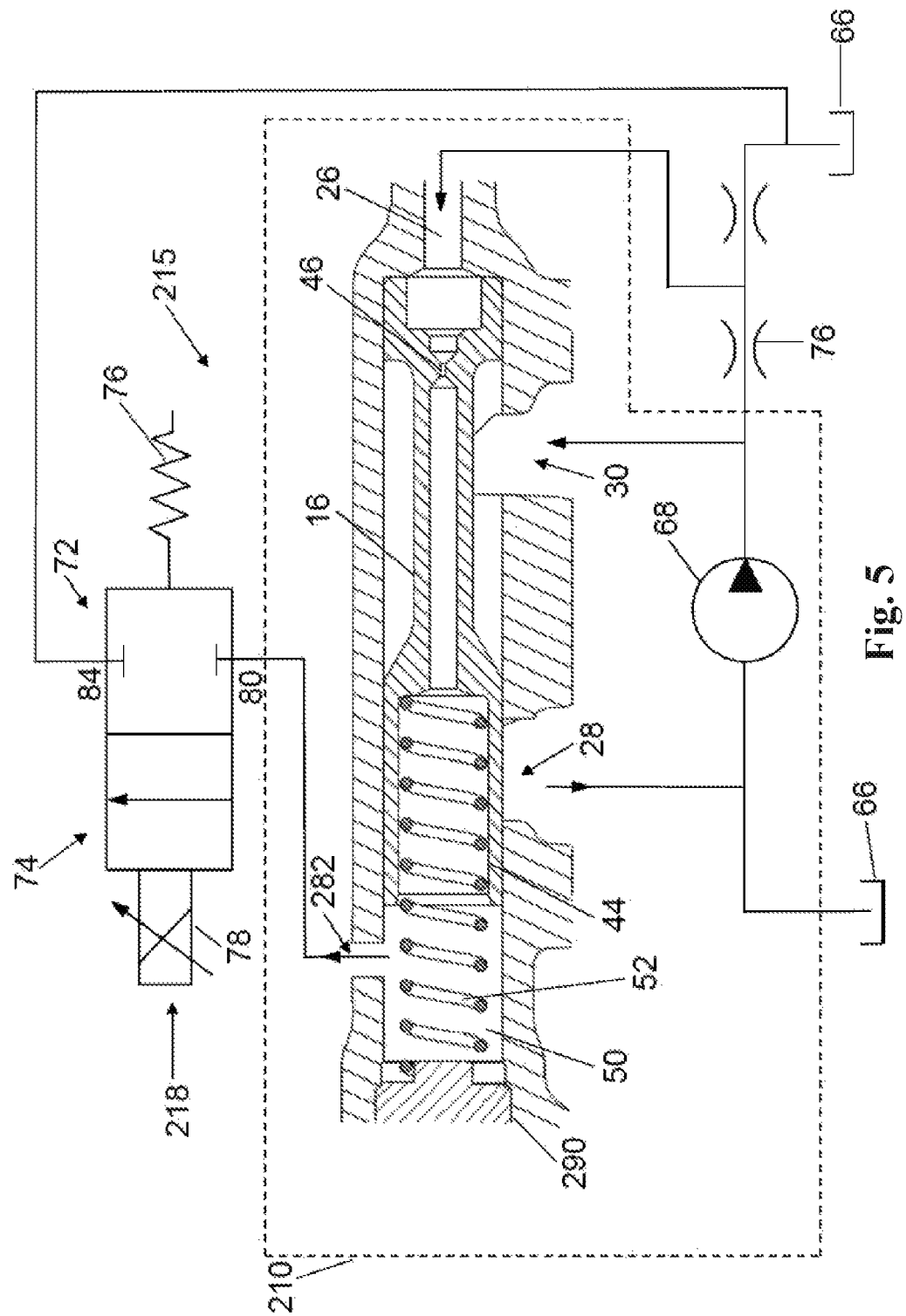
FIG. 5 is a hydraulic circuit diagram of a pump assembly having a recirculation valve according to a third embodiment of the present invention.

Referring now to FIG. 5, there is shown an alternative pump assembly 210 having a recirculation valve 215 according to a third embodiment of the present invention. Like reference numerals depict like features and will not be described further. In this embodiment, the electromagnetic solenoid valve 218 is not mounted in the open end 38 of the valve cavity 24. The electromagnetic solenoid valve 218 is fluidly connected to the control chamber 50 by fluid passage 282. Plug member 290 is mounted in the open end 38 of the valve cavity 24. Operation of the recirculation valve 215 to enable recirculation flow from the outlet port 30 to the inlet port 28 is as described above in relation to the recirculation valve 15 of the embodiment shown in FIG. 1.

Figure 6:
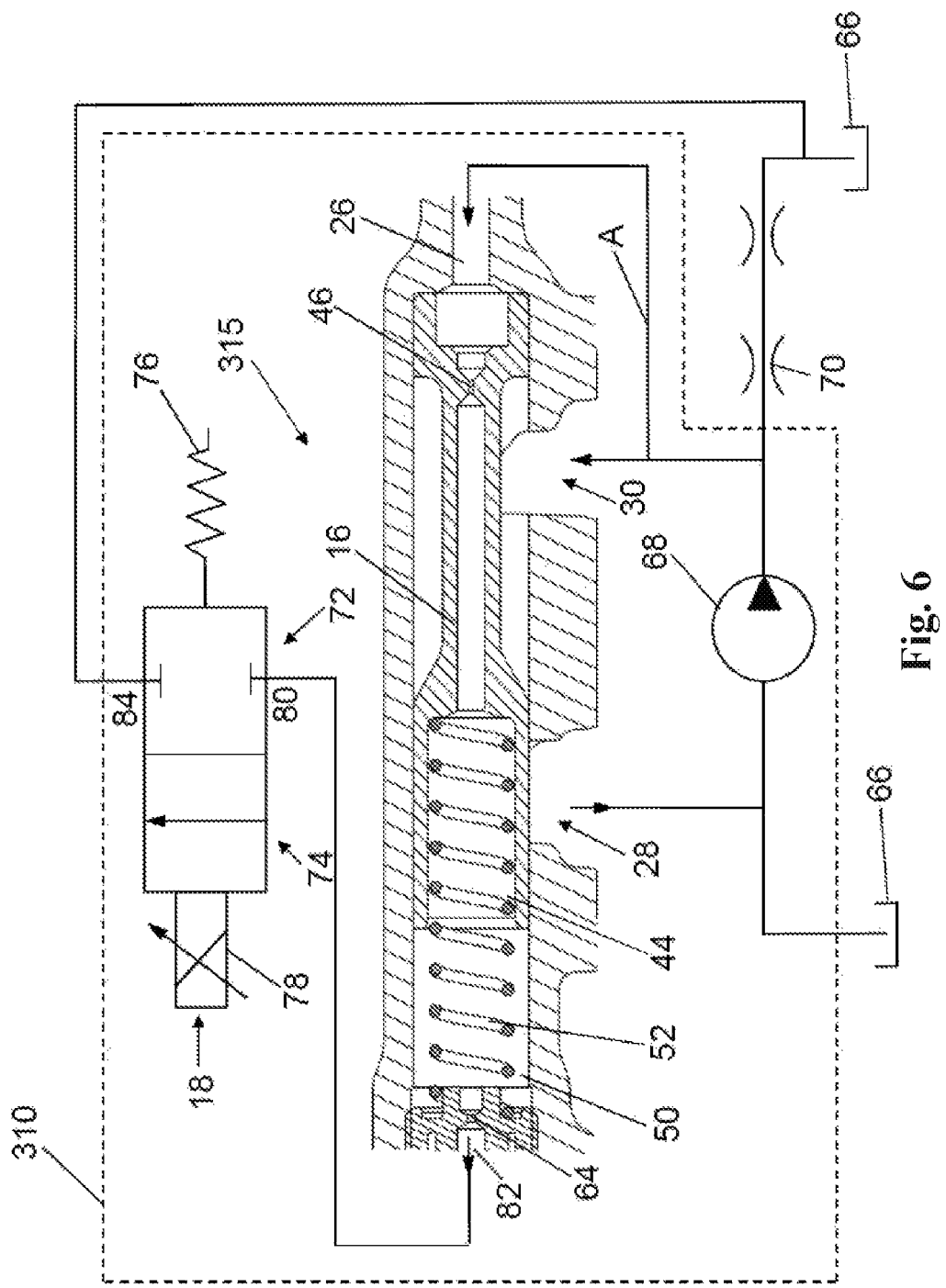
FIG. 6 is a hydraulic circuit diagram of a pump assembly having a recirculation valve according to a fourth embodiment of the present invention.

Referring now to FIG. 6, there is shown an alternative pump assembly 310 having a recirculation valve 315 according to a fourth embodiment of the present invention. Like reference numerals depict like features, which will not be described further. In this embodiment of the invention, the feedback pressure in the gallery cavity 26 is generated by fluid supplied from the outlet port 30 as depicted by line A and so does not pass through the engine cooler and filter orifice.

Figure 7:
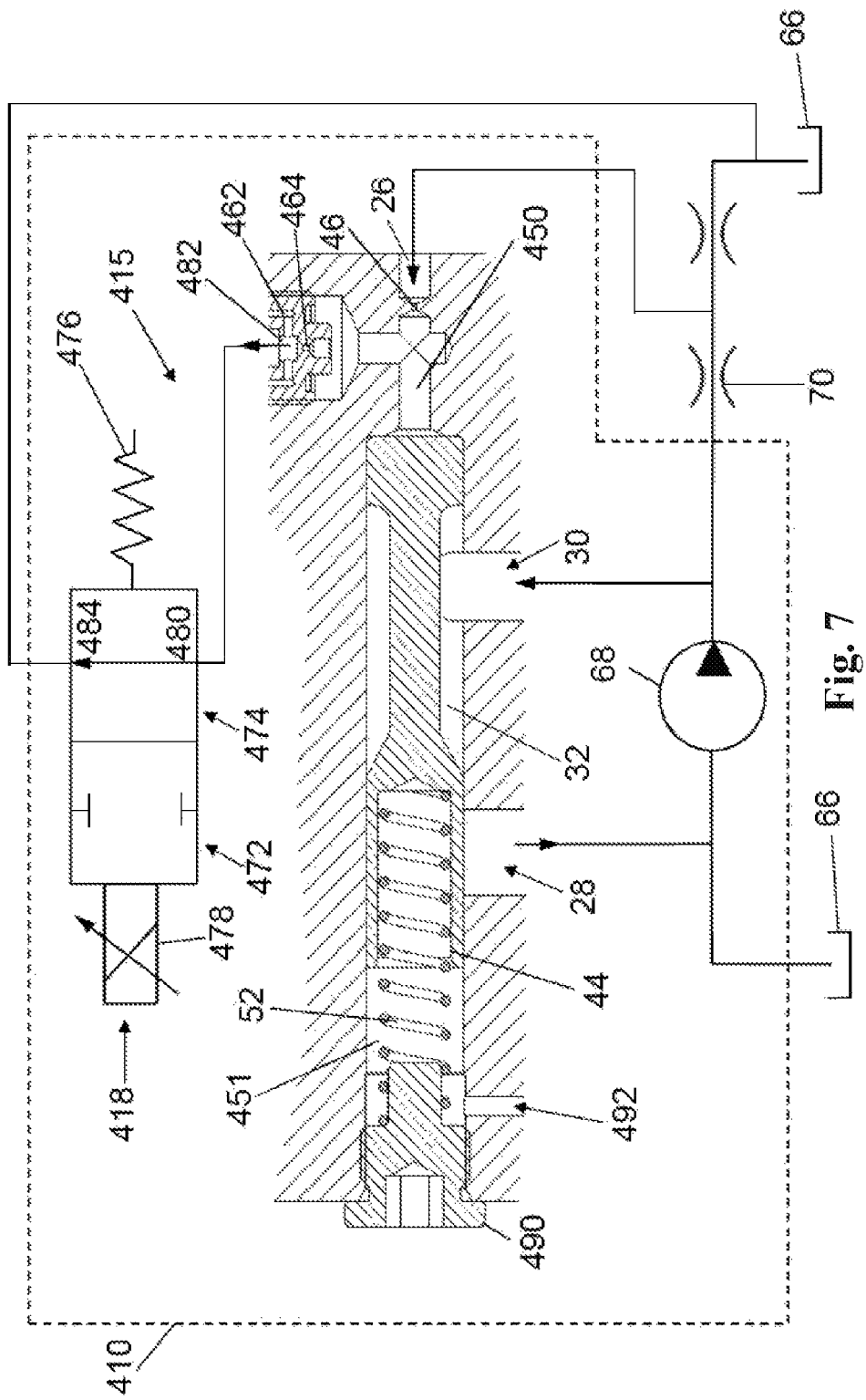
FIG. 7 is a hydraulic circuit diagram of a pump assembly having a recirculation valve according to a fifth embodiment of the present invention.

Referring now to FIG. 7, there is shown an alternative pump assembly 410 having a recirculation valve 415 according to a fifth embodiment of the present invention. Like reference numerals depict like features, which will not be described further.

The recirculation valve 415 of this embodiment has a control chamber 450 that is positioned between the gallery cavity 26 and the regulator spool valve 16. The electromagnetic solenoid valve 418, the regulator spool valve 16 and the gallery cavity 26 are in fluid communication with the control chamber 450.

The regulator spring 52 is located in chamber 451, which has a vent 492 to prevent fluid or air locks. A plug 490 is positioned in the opening 38 of the valve cavity 24.

The electromagnetic solenoid valve 418 of this embodiment is a normally-open two way valve. The electromagnetic solenoid valve 418 has two positions: a closed position 472 and an open position 474.

Fluid pressure acting on the pressure face (not shown) of the electromagnetic solenoid valve spool (not shown) opposes force from the electromagnetic solenoid valve spring 476 to move the electromagnetic solenoid valve 418 from normally open position 474 to closed position 472. Applying voltage to the proportional electromagnetic solenoid 478 changes the pre-load on the electromagnetic solenoid valve spring 476 in order to change the pressure required to move the electromagnetic solenoid valve 418 between the two positions 474, 472.

When the pressure of fluid in the fluid passage 482 is below the lower vent limit of the electromagnetic solenoid valve spring 476, the force exerted on the electromagnetic solenoid valve spool (not shown) is not sufficient to move it far enough to cause the vent port 462 to be closed, and so the electromagnetic solenoid valve 418 remains in open position 474.

The force acting on the regulator spool valve 16 due to pressure of fluid in the control chamber 450 opposes the force from the regulator spring 52 prevents movement of the regulator spool valve 16. Under these conditions, the regulator spool valve 16 remains in the position shown in FIG. 7 with the outlet port 30 in fluid communication with the fluid cavity 32. As such, there is no re-circulation flow from the outlet port 30 to the inlet port 28.

When the feedback pressure is increased, the control chamber pressure and the pressure of fluid in the fluid passage 482 is increased. When the pressure of fluid in the fluid passage 482 exceeds the lower vent limit of the electromagnetic solenoid valve spring 476, the electromagnetic solenoid valve spool (not shown) compresses the electromagnetic solenoid valve spring 476 and moves back towards the break edge of the vent port 462. As the vent port 462 starts to close, the flow of fluid through the orifice 46 is slowed, which creates a pressure increase in the cavity 450. This increased fluid pressure creates a net force on the regulator spool valve 16 that opposes the force of the regulator spring 52. The net force acting on the regulator spool valve 16 is not sufficient to enable it to move beyond the break edge of the inlet port 28 in the pump housing 12. Under these conditions, there is no re-circulation flow from the outlet port 30 to the inlet port 28 and the inlet port 28 remains isolated from the fluid cavity 32.

When the feedback pressure is further increased, the pressure of fluid in the control chamber 450 and the fluid passage 482 is further increased, causing vent port 462 to close fully. When the vent port 462 is fully closed the flow of fluid through the orifice 464 stops, causing an increase in the pressure in cavity 450. This increased fluid pressure leads to increase in the net force on the regulator spool valve 16 that opposes the force from the regulator spring 52. Under these conditions the regulator spool valve 16 compresses the regulator spring 52 further and the regulator spool valve 16 moves beyond its break edge, causing the inlet port 28 to be in fluid communication with fluid cavity 32 and enabling re-circulation of flow from the outlet port 30 to the inlet port 28.

Using proportional solenoid 478, the duty cycle of the electromagnetic solenoid valve 418 may be varied between 0% and 100% and so the pre-load of the spring 476 can be varied between a minimum and a maximum force, enabling the feedback pressures at which re-circulation occurs to be varied within a range depending on the requirements of the engine.

Referring now to FIG. 8, there is shown an alternative pump assembly 510 having a re-circulation valve 515 according to a sixth embodiment of the present invention. Like reference numerals depict like features and will not be described further. This embodiment is similar to the fifth embodiment, except that the electromagnetic solenoid valve 518 has a port 584 that is in fluid communication with a second side of the electromagnetic solenoid valve 518 and the inlet port 28. Operation of the re-circulation valve 515 is as described for the fifth embodiment.

Variations fall within the scope of the present invention, for example the electromagnetic solenoid valve of any of the embodiments of the invention may either employ a proportional solenoid or an on/off solenoid.

The electromagnetic solenoid valve of any of the embodiments of the invention may be housed within or outside of the pump assembly.

The feedback pressure may be the engine gallery pressure or the outlet port pressure. The recirculation valve may vent to the sump or the inlet port.

What is claimed is:

1. A pump assembly comprising:
 a housing defining a cavity that includes a first-end chamber, a second-end chamber, and an annular spool chamber extending therebetween, wherein the housing further defines a first port that terminates at the first-end chamber of the cavity and a second port that terminates at the annular spool chamber; and
 a recirculation valve including,
   a first spring disposed within the first-end chamber,
   a regulator spool engaged with the first spring and movable between a first position and a second position wherein when the regulator spool is in the first position the regulator spool is disposed within the annular spool chamber and caps the first port to prevent fluid flow between the first port and the second port and when the regulator spool is in the second position the regulator spool is disposed within the first-end chamber and permits fluid flow from the first port and the second port;
   a second spring, and
   a control valve having a proportional solenoid, which is engaged with the second spring, the valve being fluidly connected to an engine main gallery and the second-end chamber of the cavity, wherein the control valve is configured so that:
 when enough voltage is applied to the proportional solenoid that the pre-load of the second spring exceeds the fluid pressure in the engine main gallery, the control valve moves from an open position to a closed position, and wherein when the control valve is in the closed position, fluid pressure in the second-end chamber of the cavity exceeds the pressure exerted on the regulator spool by the first spring and moves the regulator spool axially from the first position to the second position, the proportional solenoid being operable so as to vary the pressure exerted on the control valve by the second spring.

2. The pump assembly according to claim 1, wherein the control valve is housed within the housing.

3. An internal combustion engine comprising a pump assembly according to claim 1.

4. A vehicle comprising a pump assembly according to claim 1.

* * * * *